United States Patent [19]

Fan et al.

[11] Patent Number: 5,282,392
[45] Date of Patent: Feb. 1, 1994

[54] SYNCHRO-CLUTCHING SCREW-AND-NUT MECHANISM

[75] Inventors: Chaolai Fan; Yongjie Fan; Mengqing Fan, all of Jilin, China

[73] Assignee: Chaolai Fan, Jilin, China

[21] Appl. No.: 827,273

[22] Filed: Jan. 29, 1992

[30] Foreign Application Priority Data

Jan. 31, 1991 [CN] China ............................ 91201540.3
Apr. 3, 1991 [CN] China ............................ 91101816.6

[51] Int. Cl.⁵ .......................... F16H 25/24; B25B 1/02
[52] U.S. Cl. ................................. 74/424.8 A; 269/181
[58] Field of Search ................ 74/424.8 A; 269/181

[56] References Cited

U.S. PATENT DOCUMENTS

| | | | |
|---|---|---|---|
| 616,823 | 12/1898 | Card .......................... | 74/424,8 A X |
| 802,040 | 10/1905 | Hanimann .................... | 269/179 |
| 2,102,602 | 12/1937 | Nash .......................... | 81/33 |
| 2,430,458 | 11/1947 | Farrell ........................ | 74/424.8 A |
| 2,612,057 | 9/1952 | Gray et al. .................. | 74/424.8 A |
| 2,672,776 | 3/1954 | Eisenheimer ................. | 81/37 |
| 3,007,358 | 11/1961 | Vogl .......................... | 74/424.8 R |
| 3,492,886 | 2/1970 | Naureckas ................... | 74/424.8 R |
| 3,669,440 | 6/1972 | Jartasyj et al. .............. | 269/181 |
| 4,395,030 | 7/1983 | Eskuchen .................... | 74/424.8 R |
| 4,923,185 | 5/1990 | Fan ........................... | 269/181 |
| 5,101,679 | 4/1992 | Smith et al. ................. | 74/424.8 A |

FOREIGN PATENT DOCUMENTS

| | | |
|---|---|---|
| 639918 | 4/1962 | Canada . |
| 1046213 | 10/1990 | China . |
| 0354644 | 2/1990 | European Pat. Off. . |
| 2814137 | 10/1979 | Fed. Rep. of Germany . |
| 819506 | 9/1959 | United Kingdom . |

*Primary Examiner*—Allan D. Herrmann
*Attorney, Agent, or Firm*—Darby & Darby

[57] ABSTRACT

This invention relates to a new type of screw-and-nut mechanism comprising a screw stem supported in a structure, the screw stem is to engage with a partially threaded nut also contained in the structure and actuated by a lifting means to effect the quick meshing and disengagement of the nut and the screw stem. With the inclusion of a locking device the screw stem can be made to advance and retract slowly as well as quickly. The merit of not requiring the screw stem to move up and down makes in interchangeable with other mechanisms; the three-point-contained feature enables the screw-and-nut mechanism to sustain large axial loads. Its simple structure and easy operation ensures its wide application in bench vices, parallel-jaw vices and sliding tables of machine tools and all kinds of screw-driven devices requiring fast translational motion.

52 Claims, 7 Drawing Sheets

SYNCHRO-CLUTCHING SCREW-AND-NUT MECHANISM

TECHNICAL FIELD OF THE INVENTION

This invention relates to a new type of screw-and-nut mechanism. It is especially suited for application in the feed and transmission systems in the kinematic pairs in bench vises, parallel-jaw vises, tail stocks and sliding tables used on machine tools, and also for all kinds of screw-driven devices requiring fast translational motion.

BACKGROUND OF THE INVENTION

Figure 11:
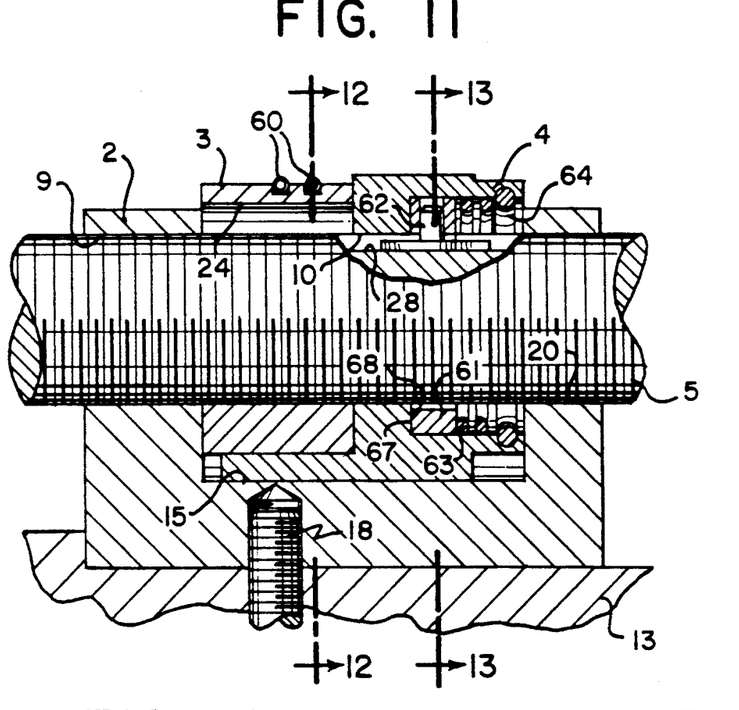
FIG. 11 is an elevation, partly in cross-section, showing an embodiment with a framework as the supporting structure and a friction-ring overload release device.

On Apr. 7, 1989, the applicant submitted to the Chinese Patent Office a patient application under the title "A new Type of Screw-driven Mechanism", the number of this patent application is 89102066.7 now Chinese patent No. 1,046,213. In FIG. 11 of said application is disclosed a screw stem with the journals at its two ends rotatably supported in bearings disposed in fixed bearing supports, and under the action of an eccentric cam sleeve and a uni-directional pawl, a half-nut can be made to slide up and down along a guide post, whereby the meshing and disengagement of the screw and the half-nut can be effected. This prior art is simple and useful, however, it can only be applied to relatively rigid screw stems of a relatively short length, otherwise the screw stem will likely be bent and will not work properly.

The object of the present invention is to overcome the shortcomings of said prior art and to provide a synchro-clutching mechanism suitable for application on screw stems of various lengths.

SUMMARY OF THE INVENTION

The above-mentioned object is attained through the present invention of a synchro-clutching screw-and-nut mechanism comprising a screw stem supported in a structure, the screw stem is to engage with a partially threaded nut also contained in the structure and actuated by a lifting means to effect its upward and downward movement, the structural features being:

(1) The supporting structure 2 comprises supporting arms, base plate and lift-guiding means, the screw stem 5 is slidably supported in the holes provided in the supporting arms, and is to co-function with the partially threaded nut 3 with its lifting device set between the supporting arms;

(2) The partially threaded nut assembly comprises a nut 3 with internal threads on less than half of the internal perimeter of an oval hole therein, a means for guiding the nut to move up and down and means to effect the up-and-down movement of the nut;

(3) An actuating device to transmit the force to actuate the lifting device, a overload release device and a lift-limiting device are provided.

The invention also incorporates a locking device to lock the nut in position so that the screw stem can be advanced or retracted slowly by turning it in the usual manner.

The merits of this invention are: The partially threaded nut is made to move up and down relative to the screw stem. This overcomes the shortcomings of up-and-down movement of the screw stem, as is the practice of prior art designs. The function of quick meshing and disengagement between the nut and screw enables a fast advance or retraction of the screw stem over its empty travel and quick adjustment of distance, thus elevating work efficiency. Because the radial internal forces in the mechanism are well balanced within a three-point-contained system it can sustain large axial loads. Especially its merit of not requiring the screw stem to move up and down makes it easy to exchange an existing screw-and-nut mechanism with one of the present invention. Also the meshing and disengagement operation of the screw-and-nut mechanism of the present invention is synchronized with the turning motion of the screw stem, thus it can be used in bench vises, parallel-jaw vises and tail stocks, carriages and sliding tables of machine tools, and all kinds of screw-and-nut transmissions that require fast translational movement for enhanced efficiency. This mechanism not only overcomes the drawbacks of prior art devices while retaining all their merits, it also possesses the features of capable of sustaining high axial loads, quick meshing and disengagement, simple in structure and easy to operate.

BRIEF DESCRIPTION OF THE DRAWINGS

Taking the application of the present invention in a bench vise as an example, the structure and working principles of the various embodiments of the invention are explained with the illustration of the accompanying drawings:

FIG. 18 is an elevation view, partly in cross-section, of an overload release device of the radial-pin-and-dent type, equivalent in effect to the axial-pin-and-dent design in FIG. 17.

DETAILED DESCRIPTION OF THE EMBODIMENT

Figure 1:
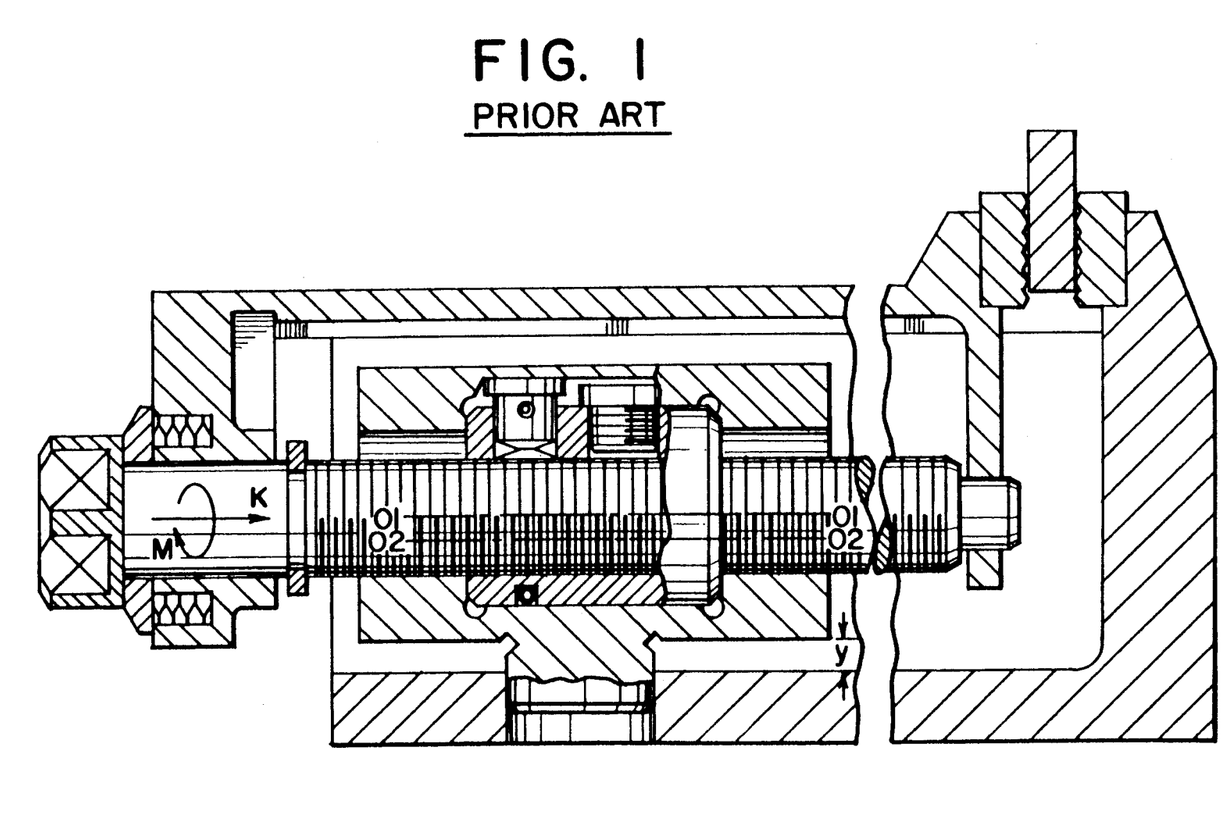
FIG. 1 is a view, partly in section, of a prior art screw-driven mechanism with a saddle-shaped half-threaded nut which can be lifted and lowered for meshing and disengagement.
Figure 2:
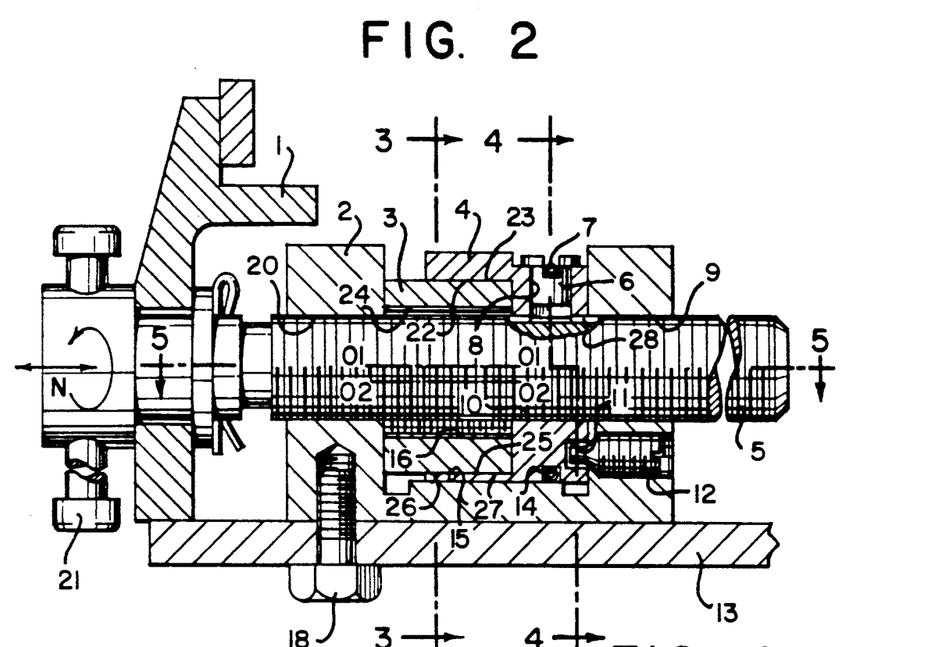
FIG. 2 is a sectional elevation view, partly in section, of the screw-and-nut mechanism of the present invention with the partially threaded nut in its lowered position, the threads of the screw and of the nut being disengaged.
Figure 5:
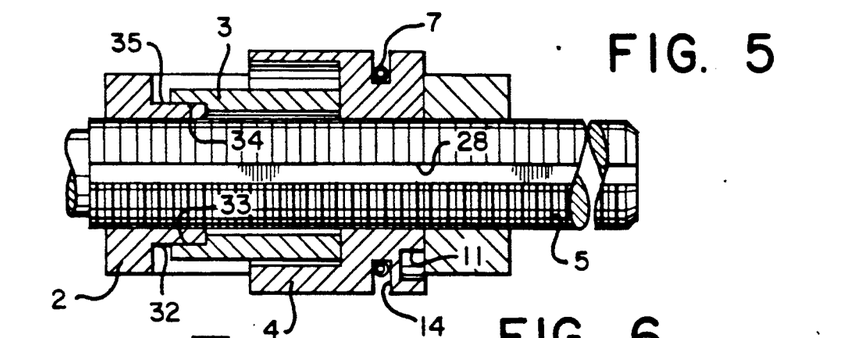
FIG. 5 is a top sectional view of a part of the mechanism of FIG. 2.
Figures 9, 10:
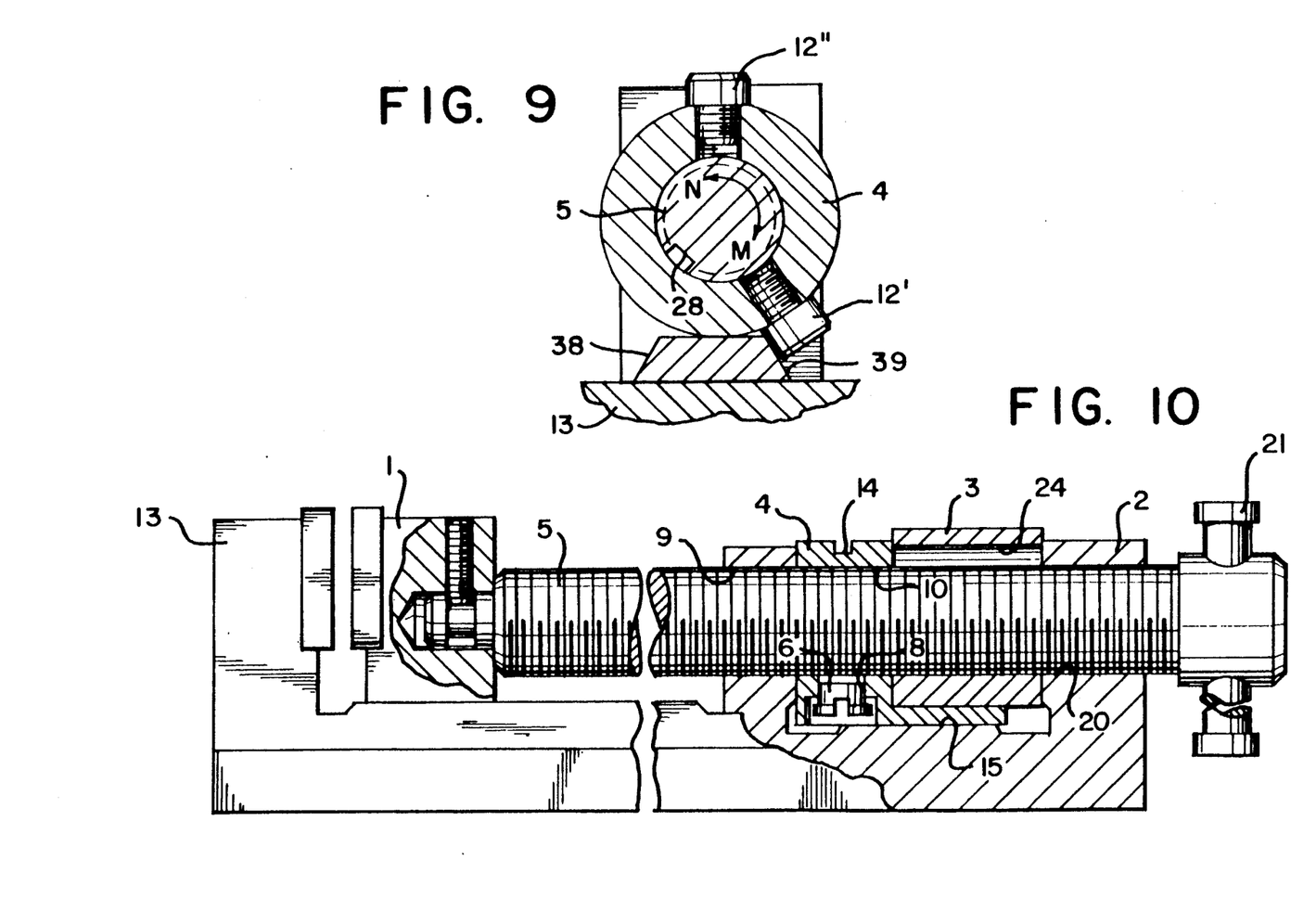
FIG. 9 is a view of an alternative embodiment to that in FIG. 8 of the device for the limitation of turning angle of the nut-lifting sleeve.
FIG. 10 is a view, partly in cross-section, showing the integration of the supporting framework of the screw-and-nut mechanism with the fixed vice member.
Figures 14, 15, 17:
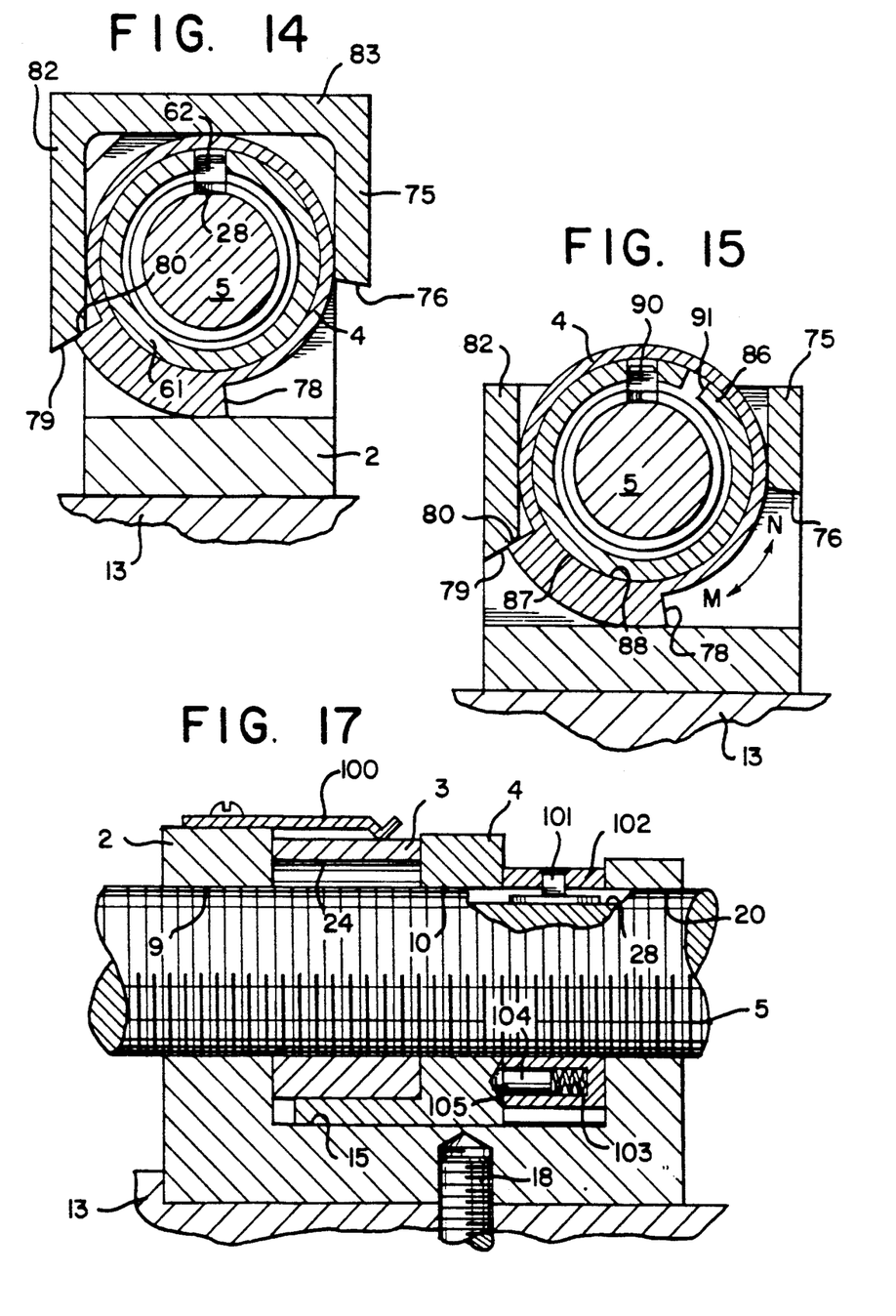
FIG. 14 is a sectional view in the direction of lines 13—13 of FIG. 11 of an alternative embodiment with the side-bars of the framework being replaced by a separately assembled top frame.
FIG. 15 is a sectional view in the direction of lines 13—13 of FIG. 11 of an alternative embodiment with the overload release device replaced by an expanding friction ring type device.

Referring to FIG. 2 of the accompanying drawings, the supporting structure 2 may be a saddle-shaped member, the screw stem 5 with external threads along its length is slidably supported in the supporting holes 9, 20 bores in the two arms of the saddle (supporting arms). Guiding surfaces 32, 35 are provided on the left supporting arm (FIG. 5) to slidably engage with the guiding surfaces 33, 34 on the partially threaded nut 3 to guide the lift of the latter. The lift-guiding members may be guided kinematic pairs with gliding members or rollers; the cross-section of the guiding members may be of various shapes such as rectangular, triangular, dovetail shaped or curvilinear (circular or arc-shaped). In a framed supporting structure 2 the lift-guiding surfaces 72, 74 may be machined off the inner face of the side bars 82, 75 (see FIGS. 11, 12). For convenience of machining, the side bars 82, 75 may be separate members of the main framework and fixed to the latter after machining and assembled with a fixing piece 83 (FIG. 14). The supporting surface 15 in the base plate of the structure contacts the outer periphery 26 of the nut-lifting sleeve 4, while the bottom face of the base plate is secured to the vice body by screws 18. The joining method of the supporting structure with the vice body or sliding table, in fact, may also use any other surface of the structure to join with a fixed (or movable) vice member (or sliding table), the supporting structure may even be integrally incorporated in the fixed (or movable) member 13 of the vice, as is shown in FIG. 10. Also, the arms with the supporting holes may be separately fixed onto the sliding table away from the structure.

The "partially threaded nut" 3 has an oval bore composed of two semi-circular holes and a connecting central portion. The lower (or upper) semi-circular hole has internal thread 16 (preferably Acme thread or sharp V thread) to mesh with the external thread on the screw stem 5, the threaded portion extends over slightly less than half of the perimeter of the hole, the upper (or lower) semi-circular hole 24 has a plain internal surface, with an internal diameter larger than the external diameter of the screw stem. The distance between the centers of the two semi-circular holes is greater than the tooth height of the thread. The partially threaded nut 3 may have the form of a half-nut, deleting its upper, plain-surfaced half. At the left end of the partially threaded nut 3, two guiding surfaces 33 and 34 are provided in a recess (or it may also be designed as male guiding surfaces, such as 77, 81 in FIG. 12) to slidably engage with the guiding surfaces 32, 35 (or guiding surfaces 74, 72 in FIG. 12) in the supporting structure. At the outer periphery of the partially threaded nut, two diametrically opposite corners 23, 27 are in contact engagement with the depressing and lifting cam surfaces 22, 25 disposed on the inner periphery of the nut-lifting sleeve 4. Said corners may be rounded off to have arc surfaces of a small radius.

Figures 6, 7, 8:
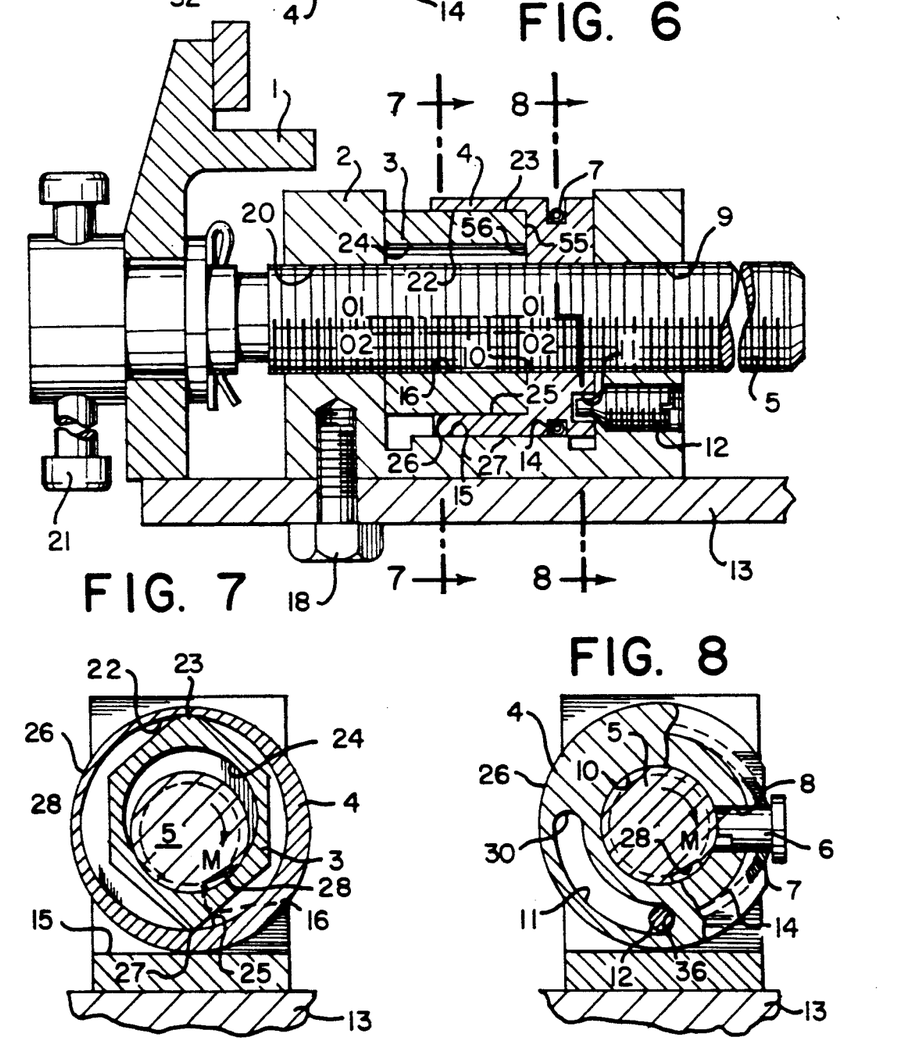
FIG. 6 is a sectional elevation of the screw-and-nut mechanism of the present invention with the partially threaded nut in its lifted position, the threads of the screw and of the nut being in mesh.
FIG. 7 is a sectional view in the direction of lines 7—7 of FIG. 6.
FIG. 8 is a sectional view in the direction of lines 8—8 of FIG. 6.
Figure 12:
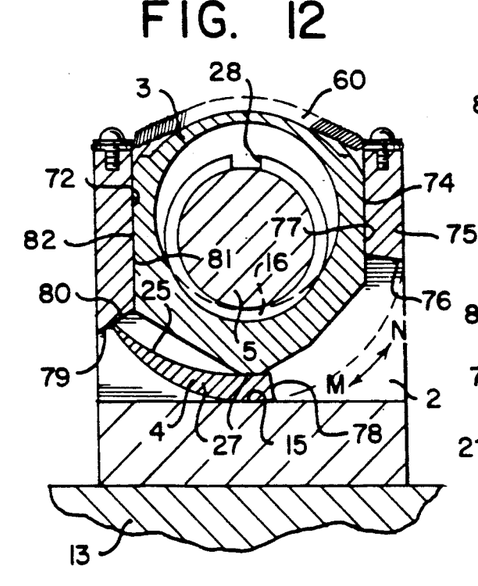
FIG. 12 is a sectional view in the direction of lines 12—12 of FIG. 11.

The nut-lifting device with an overload release mechanism consists of a nut-lifting sleeve 4, a pawl 6, a looped coil spring 7 and a stop pin 12. The two cam surfaces 25, 22 to effect the rise and fall of the nut 3 are provided on the inner surface at the left end of the nut-lifting sleeve 4, said cam surfaces 25, 22 are in contact engagement with the corresponding corners 27, 23 on the partially threaded nut 3. As the screw stem 5 is turned in the direction M (see FIG. 7), it also turns the nut-lifting sleeve 4 in the same direction, the lower cam surface 25 of the nut-lifting sleeve 4 pushes against the nut corner 27 and thus lifts the partially threaded nut 3 upwards until the threads of the screw stem and the nut mesh with each other. On the other hand, when the screw stem 5 is turned in the opposite direction N, the upper cam surface 22 of the nut-lifting sleeve presses the nut corner 23 and thus presses the partially threaded nut 3 downwards until the threads of the screw stem and the nut disengage from each other. This lifting device may also dispense with the upper cam surface 22 of the nut-lifting sleeve 4 as illustrated in FIGS. 11, 12, and use a looped coil spring 60 (or the strip spring 100 in FIG. 17) to replace the function of cam surface 22 to force the partially threaded nut 3 to descend. Similarly, alternative devices may be used to effect the up and down movement of the nut 3, for instance, co-functioning end-face cams, or end-face cam-groove and guide-pin may be set in the end face 55 of the partially threaded nut 3 and the end face 56 of the nut-lifting sleeve 4 (FIG. 6) to replace the cam surfaces 22, 25. Other equivalent-effect devices such as connecting rods, cranks and levers may also be used.

Figure 3:
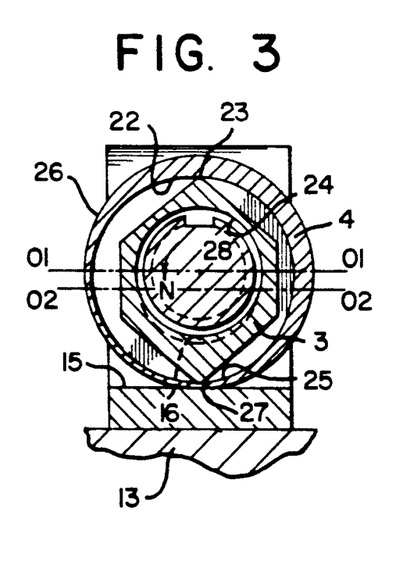
FIG. 3 is a sectional view in the direction of lines 3—3 of FIG. 2.
Figure 4:
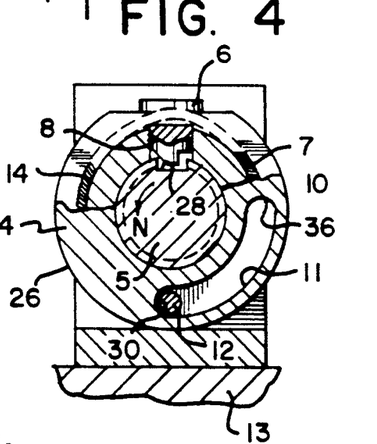
FIG. 4 is a sectional view in the direction of lines 4—4 of FIG. 2.
Figure 4A:
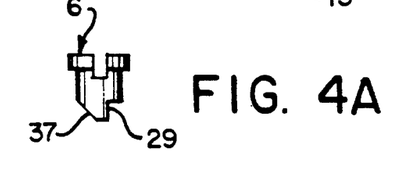
FIG. 4A is an elevational view of FIG. 4.

The bore 10 at the right end of the nut-lifting sleeve 4 fits slidably over the outer periphery of the screw stem 5, and the outer periphery 26 concentric with bore 10 is in contact with the supporting surface 15. A hole 8 is located at the right end of the nut-lifting sleeve 4, wherein a pawl 6 is slidably encased. Also one (or more) groove 14 is provided around the outer periphery of the nut-lifting sleeve 4, wherein a looped coil spring 7 is placed to press on the pawl 6, so that the slant face 37 at the lower tip of the pawl 6 is tightly pressed in the axial keyway 28 and engages with the lateral edge of said keyway 28. When the screw stem 5 is turned in the direction M (see FIG. 3), the torque is transmitted through the slant face 37 to turn nut-lifting sleeve 4 simultaneously in the direction M, until the extrimity of the arc-shaped slot 36 engages with the stop pin 12, thus stopping the turning of the nut-lifting sleeve 4. However, the screw stem 5 continues to be turned in the direction M, the force acting on the slant face 37 of the pawl 6 increases, until the axial component of the force acting on the pawl 6 overcomes the tightening force of the looped coil spring 7 and the slant face 37 slips out of the keyway 28, causing the disengagement of the nut-lifting sleeve 4 from the screw stem 5 while not impeding the further turning of the screw stem 5, playing the role of an overload releasing clutch. The lower tip of the pawl 6 may be more appropriately designed to have two opposite slant faces, thus would serve as a bi-directional overload clutch. However, as a bench vice is taken as the embodiment example here, when the screw stem 5 is turned in the opposite direction (i.e. in the direction N), it usually serve to loosen the work piece. In such cases it would be better to let the operator have a feel of touch that loosening has been achieved. If the screw stem 5 is forced to a stop, the feeling will be more pronounced. In order to attain such an aim, it is sometimes appropriate to make the lower tip of the pawl 6 to have one face 37 slanting and the opposite face 29 right-angular, as is shown in FIG. 4.

Figure 13:
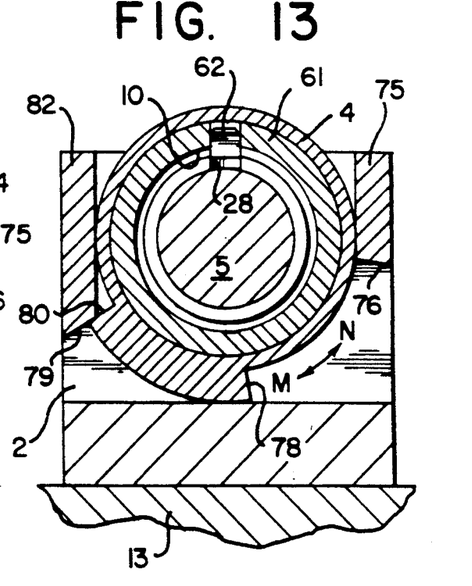
FIG. 13 is a sectional view in the direction of lines 13—13 of FIG. 11.

In the process of torque-transmission from the screw stem 5 to the nut-lifting sleeve 4, various forms of overload clutches with equivalent effects may be used. Classifying them by their types, they may be uni-directional, bi-directional, over-riding, magnetic, hydraulic or pneumatic; classifying them by their clutching elements, they may have pawls, jaws, steel balls, guide pins, friction cones (discs, plates, blocks, rings, pads, etc.) and various springy elements (such as springs, expanding rings, contacting hoops, expanding sleeves, etc.). In short, all types of overload clutches are the equivalents of the overload release devices within the scope of the present invention. Some embodiment examples of the overload release devices are described below. FIGS. 11, 12, 13 show an overload release device of the friction ring (or cone) type. Its working principle is: the friction ring (cone) 61 is disposed within the nut-lifting sleeve 4 and is slidably mounted on the periphery of the screw stem 5. Under the action of the compression spring 63, its left friction surface (cone) 67 is tightly pressed against the right friction surface (cone) 68 of the nut-lifting sleeve 4. The friction ring (cone) 61 is connected with the screw stem 5 through the guide key 62. When the screw stem 5 is turned, the torque is transmitted via the keyway 28, guide key 62, the left friction surface (cone) 67 of the friction ring (cone) 61 to the nut-lifting sleeve 4 and drives the latter to rotate with it. When the locating face 78 (or 80) of the nut-lifting sleeve 4 contacts the limiting face 76 (or 79) on the framework, the nut-lifting sleeve 4 stops rotating while the screw stem 5 continues to be turned, the turning torque will overcome the frictional torque on the left friction surface (cone) 67 of the friction ring (cone) 61, causing these surfaces to slip, thus effects the overload release.

FIG. 15 shows an expanding friction ring type overload release device. Its working principle is: the friction ring 61 and compression spring 63 in FIG. 11 are replaced by the expanding friction ring 86, and the limiting ring 64 is used in this case to limit the axial movement of the expanding friction ring 86. An open slot 91 is made in the cylindrical body of the ring 86. In its free state this ring will have a diameter of its external periphery 87 larger than the diameter of the bore 88 of the nut-lifting sleeve 4. When assembling, the open slot 91 is forced to close, releasing it after the ring 86 has been slipped into the bore 88. Thus the external periphery 87 of the expanding ring 86 will bear against the bore surface 88 under its own spring force, producing a frictional force between them. The internal diameter of the expanding ring 86 is slightly larger than the external diameter of the screw stem 5, the expanding ring being connected with the screw stem 5 through the guide key 90. The working process is similar to that of the friction ring in FIG. 11, the difference being during overload condition slipping occurs at the external periphery of the expanding ring instead of the end surface of the friction ring.

Figures 16, 19:
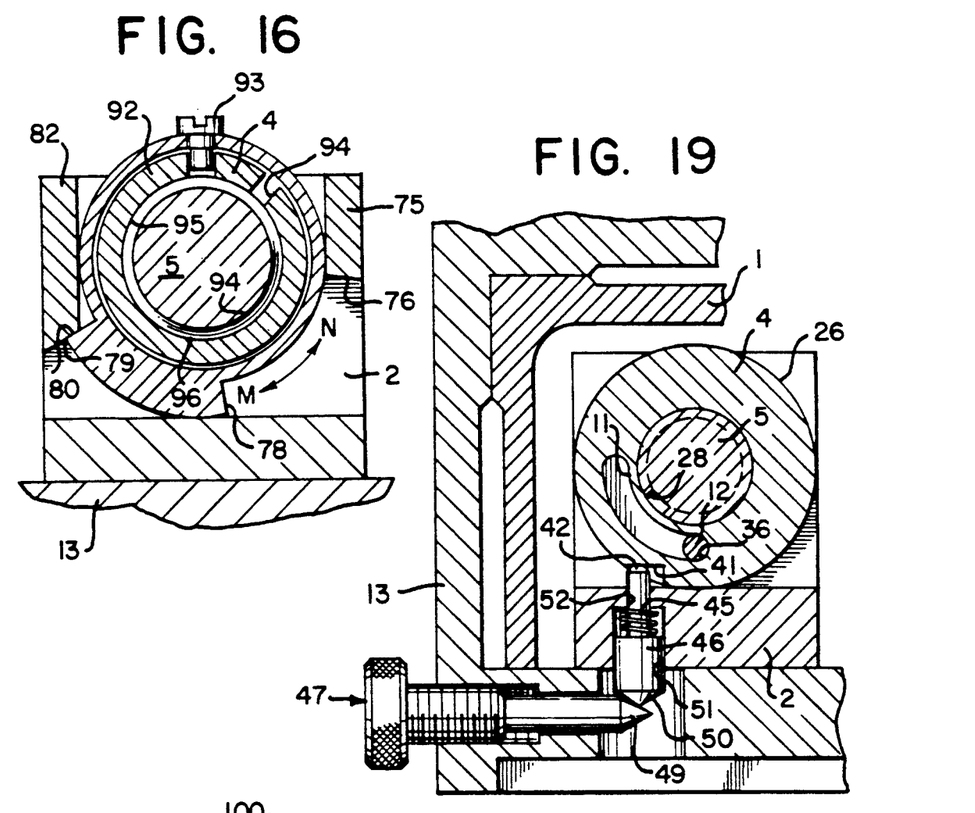
FIG. 16 is a sectional view in the direction of lines 13—13 of FIG. 11 of an alternative embodiment with the overload release device replaced by a contracting friction hoop type device.
FIG. 19 is a view of a similar embodiment as in FIG. 2 with the addition of a locking device, showing the sectional view in the direction of lines 4—4 in FIG. 2.

FIG. 16 shows a contracting friction hoop type overload release device. Its working principle is substantially similar to that of the device shown in FIG. 15. The contracting friction hoop 92 also has an axial open slot 94. In its free state the internal diameter of its bore 95 is slightly smaller than the external diameter 96 of the screw stem 5. After assembling, the hoop 92 will tightly hold on the cylindrical periphery of the screw stem 5, producing a frictional force between them. (There is no keyway on the screw stem 5 in this case). The external diameter of the contracting friction hoop 92 is smaller than that of the bore of the nut-lifting sleeve 4. The turning torque of the screw stem 5 is transmitted to the nut-lifting sleeve through a pin 93. Its working process is similar to that of the device shown in FIG. 15, only the slipping under overload condition takes place between the friction surfaces of the external periphery of screw stem 5 and the inner surface of the bore of the hoop.

Figure 18:
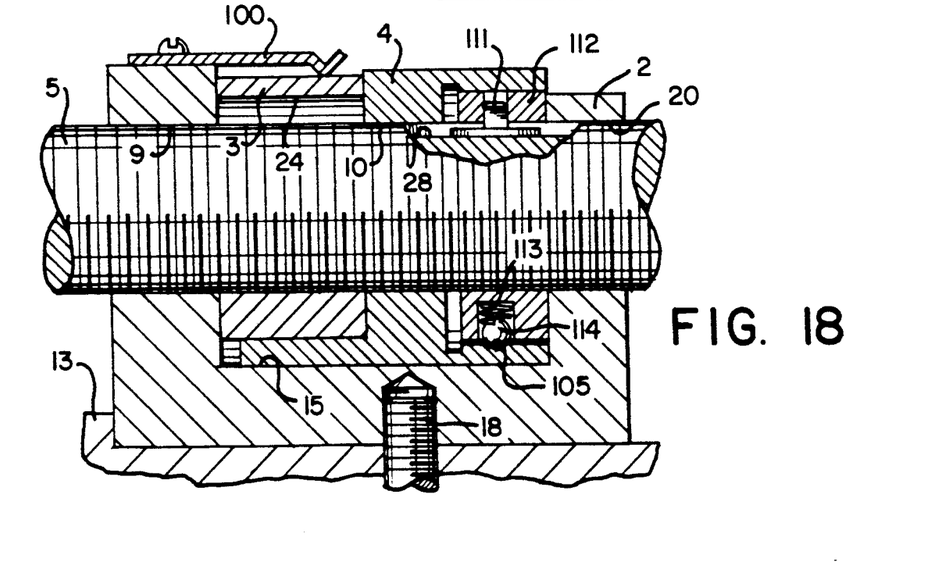
FIG. 18 is a sectional elevation of the screw-and-nut mechanism of FIG. 11, with the overload release device replaced by an axial-pin-and-dent option.

FIG. 17 is an axially disposed guide pin (or steel ball) overload release device. Its working principle is thus: in the left end surface of the sleeve 102 mounted on the screw stem 5 is drilled an axial hole, wherein a small compression spring 103 and a guide pin (or steel ball) 104 is lodged. This pin (or steel ball) engages with a small conical dent 105 located in the right end surface of the nut-lifting sleeve 4. Also its working process is basically similar to that of the device in FIG. 11, only the friction of the end surfaces in FIG. 11 is substituted by the clogging force between the conical dent and guide pin (or steel ball). The device shown in FIG. 18 is an equivalent of that in FIG. 17, only that the axially disposed guide pin hole in FIG. 17 is replaced by the radially guide pin hole in FIG. 18. Their working principles are the same.

Based on the device in FIG. 17, supposing on the respective contacting end surfaces of slip sleeve 102 and nut-lifting sleeve 4, end jaws, i.e. pawls with a certain inclination angle of the face (uni-directional or bi-directional) are disposed, then with the provision of a compression spring and the necessary space for the rightward movement of the slip sleeve 102 after overload release, the device in FIG. 17 will become an end-jaw-clutch type overload release device. In short, there may be numerous overload release devices comprising of different overload releasing element that all fall within the scope of equivalent devices of the present invention.

In FIGS. 2, 4, at the right end of the nut-lifting sleeve 4 there is provided a motion-limiting slot 11 to limit the turning angle of the nut-lifting sleeve 4 through the contact of the stop pin 12 with the two extremities 30, 36 of the slot. The motion-limiting slot 11 may be replaced by a slot over an arc in the periphery at the right end of the nut-lifting sleeve 4 or by a circumferential slot over an arc, or the stop in 12 (one or two) may be fixed on the outer periphery of the nut-lifting sleeve 4, as is shown in FIG. 3, thus the limiting faces 38, 39 on the two sides of the base plate can be used to limit the turning angle of the nut-lifting sleeve 4. When the support is designed in the form of a framework as is shown in FIGS. 11, 12, the surface underneath the side bars 79, 76 may be used as limiting faces. Obviously there may be numerous motion-limiting devices that fall within the scope of the present invention.

One or more axial slots are disposed on the outer periphery of the screw stem 5. These slots are to engage with the pawl 6 in FIG. 2, and to co-function with the guide key in FIGS. 11, 15, 17. When adopting the overload release device of the contracting-hoop type shown in FIG. 16, no slots need to be provided on screw stem 5.

As the partially threaded nut is disposed between the two supporting arms with the bearing holes, the screw stem leads through these holes and is supported therein, so aster the meshing of the screw threads, a three-point contained system is formed among the two bearing holes 20, 9 and the centrally disposed threaded portion 16 in the nut, this system has all the radial forces well balanced with a quick meshing and disengaging screw assembly, it can thus sustain very large axial loads.

The working principle of the screw-and-nut mechanism with its meshing and disengagement effected by the lifting and depressing of the partially threaded nut having a uni-directional pawl is thus: When it is required to loosen the clamped workpiece and rapidly retract the movable vice member 1, the handle 21 is operated to cause the screw stem 5 to turn towards the left, in the direction N (see FIGS. 2, 3, 4), pawl 6 is depressed by the looped coil spring 7 and lodges in the axial keyway 28 in the screw stem 5. The lateral face of the keyway 28 bears against the right-angled face 29 of the pawl 6 and drives the nut-lifting sleeve 4 to turn left, whereby the cam surface 22 acts on the upper corner 23 of the nut and depresses the latter until stop pin 12 engages with the left extremity 30 of the arc-shaped slot 11. At this moment the center line of the internal threads in the partially threaded nut 3 is lowered from its highest position 01—01 to its lowest position 02—02, completely disengaging the internal thread 16 in the nut from the external thread on the screw stem 5. The screw stem 5 and the movable vice member 1 can now be pulled back freely with the hand, fulfilling the requirement of fast traversing over the empty-travel and quick adjustment of the opening of the gap between the vice jaws.

Reversely, when it is required to clamp the workpiece in the vice, the handle 21 is operated to cause the screw stem 5 to turn towards the right, in the direction M (see FIGS. 6, 7, 8), the lateral edge of the keyway 28 bears against the slant face 37 of the pawl 6 and drives the nut-lifting sleeve 4 to turn right, whereby the cam surface 25 acts on the lower corner 27 of the nut 3 and lifts the latter until stop pin 12 engages with the right extremity 36 of the arc-shaped slot 11. At this moment the center line of the internal threads in the partially threaded nut 3 is raised from its lowers position 02—02 to the highest position 01—01, coinciding with the axis of the screw stem 5, effecting a complete meshing of the internal threads 16 in the lower half periphery of the nut with the external thread on the screw stem 5. As the screw stem 5 continues to be turned in the direction M, the pawl-type overload release mechanism will slip and will not impede the screw stem 5 to turn in the direction M. As the nut is held stationary, the screw stem will carry the movable vice member to move along the direction K, until the workpiece is tightly clamped.

FIG. 11 shows a lift-nut-to-engage type screw-and-nut mechanism with a framework wherein is disposed a nut-lifting sleeve having only a lower cam surface and an end-friction-ring type overload release device. Its working principle is basically the same as that in FIG. 2. When the screw stem 5 is turned in the direction M, the torque in the screw stem is transmitted to the nut-lifting sleeve 4 through the guide key 62 and the friction ring 61, causing the nut-lifting sleeve 4 to turn also in the direction M, until it is stopped by the limiting face 79. At this moment the partially threaded nut 3 has been raised to its highest point, the threads on the screw stem and in the nut are meshed. Further turning of the screw stem 5 will cause the end friction surfaces of the overload release mechanism to slip, allowing the screw stem 5 to be turned further until the workpiece is tightly clamped. On rotating the screw stem in the opposite direction (direction N), the end friction ring will cause the nut-lifting sleeve 4 to also rotate in the direction N, until the limiting face is reached, under the action of the looped coil spring 60 the partially threaded nut s depressed to its lowest position, the threads are disengaged, the vice jaw (or sliding plate) may now be freely retracted to the right position.

Based on the embodiment of FIG. 2, FIG. 19 shows the inclusion of a locking mechanism that may be used to control the lifting and depressing of the partially threaded nut, thus enabling the screw stem 5 not only to advance slowly but also retract slowly. This function is explained with the mechanism in FIGS. 2, 8 as basis. Firstly, the pawl 6 is to be changed with one having dual slant faces. The locking mechanism comprises of a set pin 46, a compression spring 45, a tapered-tip screw 47 and a locating face 41 in the nut-lifting sleeve 4. The set pin 46 is received in the stepped guide holes 52 and 51. By adjusting the contact position of the tapered tip 49 of the screw 47 and the tapered tip 50 at the lower end of the set pin 46, the set pin 46 is raised or lowered. When it is raised, its top face 42 will abut against the locating face 41 in the nut-lifting sleeve 4, the spring 45 is compressed. When the screw 47 is turned to be retracted towards the left, the tapered tip at its right end will be retracted towards the left, the tapered tip 50 of the set pin will be lowered under the action of the spring 45, the top face 42 of the set pin 46 is also lowered, until it is clear of the outer periphery 26 of the nut-lifting sleeve 4 and no longer hinders its rotation.

The above mentioned "locking mechanism" may be made to lock the partially threaded nut directly, the only thing one has to do is to make the top face 42 of the set pin 46 to abut against a certain part of the partially threaded nut 3. There may be various ways to lock the nut-lifting sleeve 4 or to directly lock the partially threaded nut 3 in position, for instance, to use a member in a connecting-bar mechanism to hook a certain part of the nut-lifting sleeve 4 or the partially threaded nut 3. Moreover, as for the locking mechanism itself, there may also be many options with equivalent effects and operating methods, such as to use a connecting-bar mechanism and the like for remote operation or remote control, to use hydraulic, pneumatic or magnetic actuators for raising or lowering the set pin 46. All these fall within the scope of the present invention.

There are also several embodiment examples for partial improvements, they are: (1) When the present invention is used in the transmission of comparatively small axial loads, the supporting structure in FIG. 2 may dispense with the right supporting arm and its supporting hole 9 and retain only the left supporting arm with the supporting hole 20; (2) For the supporting hole of the framework 2, a guide sleeve made of comparatively hard material may be fixed in the supporting hole, or the guide sleeve may also be integrally incorporated in the right end of the nut-lifting sleeve 4.

The synchro-clutching screw-and-nut mechanism provided by the present invention is characterized by the following merits:

(1) Because the partially threaded nut is located within the supporting structure, a three-point-contained system is attained after the threads in the nut and on the screw stem are meshed, all the radial (internal) forces are thoroughly balanced within the structure, hence its functions are reliable and very great axial forces can be transmitted. Compared with a conventional set-up with a whole nut, it is equivalent in effect in all respects regarding transmission by meshed threads, strength and loading capacity.

(2) Because the process of lifting and lowering of the partially threaded nut, hence the meshing and disengaging of the threads on the screw stem and in the nut, is self-initiated simultaneously with the turning of the screw stem, the meshing and disengagement of the threads can be completed within very short time. Experiments have shown that it requires only 0.3–0.5 seconds.

(3) Because the overload release mechanism for the nut-lifting sleeve applied the driving force in an intermittent manner (such as in the case of pawl, guide-pin or steel ball types) during the process of meshing, if ever it happens that the crests of two mating threads are in the same line, the overload release mechanism will momentarily slip and provide condition for re-meshing, thus the rate of successful meshing of the threads is 100%.

(4) Because an overload release mechanism is provided, so when the nut-lifting sleeve has completed its function, the overload release mechanism will take effect and the further turning of the screw stem is not hindered. Hence tight clamping can be achieved within the entire traveling range of the transmission mechanism.

(5) Because the axis of the screw stem does not displace up and down, it rotates around a fixed center line, hence it is interchangeable with set-ups with screw-nuts of conventional design; its range of application is wide.

(6) Its construction is very simple. Besides the screw stem and partially threaded nut, only 3 or 4 small parts need to be added, therefore its costs is low and is easy to manufacture.

(7) It is easy to operate and can be manipulated with a single handle, it preserves the conventional mode of operation and will thus be widely accepted by the user.

The applicant claims:

1. A supporting structure comprising: supporting arms having holes therein, a base plate, lift-guiding means, a screw stem slidably supported in the holes in the supporting arms, and lifting means located between the supporting arms;
   a partially threaded nut comprising a nut with an oval hole with internal threads on less than half the internal perimeter of the oval hole, means for guiding the nut to move up and down, and means to effect the up-and-down movement of the nut; and
   an actuating device to transmit a force to actuate the lifting means, an overload release device and a lift-limiting device.

2. A synchro-clutching screw-and-nut mechanism as in claim 1 further comprising a locking device to control the lifting and depressing of the partially threaded nut.

3. A synchro-clutching screw-and-nut mechanism as in claim 2, wherein said locking device to control the lifting and depressing of the partially threaded nut comprises a set pin, a compression spring, a tapered-tip screw and a locating face on the nut-lifting sleeve, the set pin being received in guide holes in the supporting structure.

4. A synchro-clutching screw-and-nut mechanism as in claim 2, where said locking device to control the lifting and depressing of the partially threaded nut comprises a set pin, a compression spring, a tapered-tip screw and a locating face on the partially threaded nut, the set pin being received in guide holes in the supporting structure.

5. A synchro-clutching screw-and-nut mechanism as in claim 1 wherein the portion of said supporting structure supporting arms which define the holes is in running fit with said screw stem, said lifting means comprising a nut-lifting sleeve and said supporting structure is saddle-shaped, said lift-guiding means having guiding surfaces on one of said supporting arms to engage slidably with guiding surfaces in the guiding means of the partially threaded nut; lift-limiting means for limiting the turning angle of said nut-lifting sleeve including a stop pin in the supporting structure to engage with a motion-limiting slot in an outer surface of said nut-lifting sleeve.

6. A synchro-clutching screw-and-nut mechanism as in claim 1 wherein the portion of said supporting structure supporting arms which define the holes is in running fit with said screw stem, said lifting means comprising a nut-lifting sleeve and said supporting structure is saddle-shaped, said lift-guiding means having guiding surfaces on one of said supporting arms to engage slidably with guiding surfaces in the guiding means of the partially threaded nut; lift-limiting means for limiting the turning angle of said nut-lifting sleeve including limiting faces in the base plate to engage with the stop pins on the nut-lifting sleeve.

7. A synchro-clutching screw-and-nut mechanism as in claim 1 wherein the portion of said supporting structure supporting arms which define the holes is in running fit with said screw stem, said lifting means comprising a nut-lifting sleeve and said supporting structure is a framework having side bars, said lift-guiding means comprising the inner surfaces of the side bars which engage slidably with guiding surfaces of the guiding means of the partially threaded nut; the supporting structure also comprises lift-limiting means for limiting the turning angle of said nut-lifting sleeve, said lift-limiting means comprising limiting faces at the bottom side of the side bars of the framework.

8. The mechanism of claim 7, wherein the side bars are separate members joined together by a fixing piece to form an independent component which is assembled with the frame-work.

9. A synchro-clutching screw-and-nut mechanism as in claim 1 wherein the portion of said supporting structure supporting arms which define the holes is in running fit with said screw stem, said lifting means comprising a nut-lifting sleeve, the supporting arms with the supporting holes being secured to a movable vice member separate from the supporting structure.

10. A synchro-clutching screw-and-nut mechanism as in claim 1 wherein said lifting means further comprises a nut lifting sleeve having a bore in running fit with the other periphery of the screw stem, the outer periphery of the nut-lifting sleeve being concentric with said bore and in contact with a supporting surface, the nut-lifting sleeve and the lifting means comprises upper and lower cam surfaces provided on the inner periphery of one end of the nut-lifting sleeve, the lifting occurring by the action between the corners of the nut and the cam surfaces which engage.

11. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, the nut-lifting sleeve and the lifting means comprises a cam surface on the lower part of the inner periphery at an end of the nut-lifting sleeve, the lifting occurring by the corner of the nut and the cam surface which engage with each other.

12. The mechanism of claim 11 further comprising a spring to act on the upper part of the partially threaded nut.

13. A synchro-clutching screw-and-nut mechanism as in claim 1 wherein the nut-lifting sleeve and the partially threaded nut comprise upper and lower cam surfaces provided on the inner periphery of one end of the nut-lifting sleeve, said lifting means comprising corners of the nut and said cam surfaces which engage.

14. A synchro-clutching screw-and-nut mechanism as in claim 1 wherein the nut-lifting sleeve and the partially threaded nut comprise a cam surface on the inner periphery of one end of the nut-lifting sleeve, said lifting means comprising a corner of said nut and said cam surface which engage.

15. The mechanism of claim 14 further comprising a spring to act on the upper part of the partially threaded nut.

16. A synchro-clutching screw-and-nut mechanism as in claim 1 further comprising an overload release device for the lifting means which comprises a radial pawl hole provided in the nut-lifting sleeve and a pawl lodged therein, the pawl being in working engagement with an axial keyway in the screw stem, and is acted on by a spring.

17. A synchro-clutching screw-and-nut mechanism as in claim 1 wherein said listing means comprises a nut-lifting sleeve and further comprises an overload release device for the lifting means which comprises a friction ring, a guide key, a compression spring and a limiting ring, the friction ring received in the nut-lifting sleeve and being connected with the screw stem through the guide key, an axial keyway provided in said screw stem to engage with said guide key.

18. A synchro-clutching screw-and-nut mechanism as in claim 1 wherein said lifting means comprises a nut-lifting sleeve and further comprising an overload release device for the lifting means which comprises a friction hoop, a torque transmission pin, the nut-lifting sleeve and a limiting ring, the hoop having an open slot, in its free state the internal diameter of the hoop being smaller than the external diameter of the screw stem, the hoop being mounted on the screw stem between said stem and said nut-lifting sleeve and being connected with said sleeve through the torque transmission pin.

19. A synchro-clutching screw-and-nut mechanism as in claim 1 wherein said listing means comprises a nut-lifting sleeve and further comprising an overload release device for the lifting means which comprises a springy expanding friction ring, a guide key, the nut-lifting sleeve and a limiting ring, the ring has an open slot, in its free state the diameter of the external periphery of the expanding ring is larger than the internal diameter of a bore of the nut-lifting sleeve, the ring being disposed between the screw stem and nut-lifting sleeve, said expanding ring being connected with said screw stem through the guide key engaged in an axial keyway provided in the screw stem.

20. A synchro-clutching screw-and-nut mechanism as in claim 1 where said lifting means comprises a nut-lifting sleeve and further comprising an overload release device for the lifting means which comprises a slip sleeve, a guide key, a compression spring, a guide pin and the nut-lifting sleeve, at least one cone-shaped dent provided on an end face of the nut-lifting sleeve, the slip sleeve being connected with the screw stem through the guide key and an axial keyway provided in said screw stem.

21. A synchro-clutching screw-and-nut mechanism as in claim 1 wherein said lifting means comprises a nut-lifting sleeve and further comprising an overload release device for the lifting means which comprises a slip sleeve, a guide key, a compression spring, a guide pin and the nut-lifting sleeve, the slip sleeve being connected with the screw stem through the guide key and an axial keyway provided in said screw stem.

22. A synchro-clutching screw-and-nut mechanism as in claim 1 wherein the portion of said supporting structure supporting arms which define the holes is in running fit with said screw stem, said lifting means comprising a nut-lifting sleeve and further comprising an overload releace device in the lifting means comprising a radial pawl hole provided in the nut-lifting sleeve, and a pawl lodged therein, the pawl being in working engagement with an axial keyway in the screw stem, and being acted on by a looped coil spring.

23. A synchro-clutching screw-and-nut mechanism as in claim 1 wherein the portion of said supporting structure supporting arms which define the holes is in running fit with said screw stem, said lifting means comprising a nut-lifting sleeve and further comprising an overload release device in the lifting means comprising the nut-lifting sleeve, a friction ring, a guide key, a compression spring and a limiting ring, the friction ring received in the nut-lifting sleeve and connected with the screw stem through the guide key, an axial keyway provided in said screw stem to engage with said guide key.

24. A synchro-clutching screw-and-nut mechanism as in claim 1 wherein the portion of said supporting structure supporting arms which define the holes is in running fit with said screw stem, said lifting means comprising a nut-lifting sleeve and further comprising an overload release device in the lifting means comprising a springy contracting friction hoop, a torque transmission pin, the nut-lifting sleeve and a limiting ring, the hoop having an open slot, in its free state the internal diameter of the hoop being smaller than the external diameter of the screw stem, the hoop being mounted on the screw stem between said stem and said nut-lifting sleeve and is connected with said sleeve through the torque transmission pin.

25. A synchro-clutching screw-and-nut mechanism as in claim 1 wherein the portion of said supporting structure supporting arms which define the holes is in running fit with said screw stem, said lifting means comprising a nut-lifting sleeve and further comprising an overload release device in the lifting means comprising a springy contracting friction ring, a guide key, the nut-lifting sleeve and a limiting ring, the ring having an open slot, in its free state the diameter of the external periphery of the expanding ring being larger than the internal diameter of the bore of the nut-lifting sleeve, the ring being disposed between the screw stem and the nut-lifting sleeve, said expanding ring being connected with said screw stem through the guide key engaged in an axial keyway provided in the screw stem.

26. A synchro-clutching screw-and-nut mechanism as in claim 1 wherein the portion of said supporting structure supporting arms which define the holes is in running fit with said screw stem, said lifting means comprising a nut-lifting sleeve and further comprising an overload release device in the lifting means comprising a slip sleeve, a guide key, a compression spring, a guide pin and the nut-lifting sleeve, at least one cone-shaped dent provided on an end face of the nut-lifting sleeve, the slip sleeve being connected with the screw stem through the guide key and an axial keyway provided in said screw stem.

27. A synchro-clutching screw-and-nut mechanism as in claim 1 wherein the portion of said supporting structure supporting arms which define the holes is in running fit with said screw stem, said lifting means comprising a nut-lifting sleeve and further comprising an overload release device in the lifting means comprising a slip sleeve, a guide key, a compression spring, a guide pin and the nut-lifting sleeve, the slip sleeve being connected with the screw stem through the guide key and an axial keyway provided in said screw stem.

28. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   a radial pawl hole provided in the nut-lifting sleeve, a pawl lodged therein, the pawl being in working engagement with an axial keyway in the screw stem, and is acted on by a looped coil spring.

29. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   the nut-lifting sleeve, a friction ring, a guide key, a compression spring and a limiting ring, the friction ring received in the nut-lifting sleeve and being connected with the screw stem through the guide key, and an axial keyway provided in said screw stem to engage with said guide key.

30. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   a springy contracting friction means, a torque transmission pin, the nut-lifting sleeve and a limiting ring, a hoop having an open slot, in its free state the internal diameter of the hoop being smaller than the external diameter of the screw stem, the hoop being mounted on the screw stem between said stem and said nut-lifting sleeve and being connected with said sleeve through the torque transmission pin.

31. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   a springy expanding friction ring, a guide key, the nut-lifting sleeve and a limiting ring, the ring having an open slot, in its free state the diameter of the external periphery of the expanding ring being larger than the internal diameter of the bore of the nut-lifting sleeve, the ring being disposed between the screw stem and the nut-lifting sleeve, said expanding ring being connected with said screw stem through the guide key engaged in an axial keyway provided in the screw stem.

32. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   a slip sleeve, a guide key, a compression spring, a guide pin and the nut-lifting sleeve, a dent provided on one end face of the nut-lifting sleeve, the slip sleeve being connected with the screw stem through the guide key and an axial keyway provided in said screw stem.

33. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, and further comprising an overload release device in the lifting means comprising:
   a slip sleeve, a guide key, a compression spring, a guide pin and the nut-lifting sleeve, the slip sleeve being connected with the screw stem through the guide key and an axial keyway provided in said screw stem.

34. A synchro-clutching screw-and-nut mechanism as in claim 1, wherein said supporting structure has at least two supporting arms with holes in said supporting arms being in running fit with said screw stem, said lifting means comprising a nut-lifting sleeve and said supporting structure, wherein the supporting structure is saddle-shaped, said lift-guiding means having guiding surfaces on one of said supporting arms to engage slidably with guiding surfaces in the guiding means of the partially threaded nut, lift-limiting means for limiting the turning angle of said nut-lifting sleeve comprising a stop pin in the supporting structure to engage with a motion-limiting slot in a surface of said nut-lifting sleeve.

35. A synchro-clutching screw-and-nut mechanism as in claim 1, wherein said supporting structure has at least two supporting arms with holes in said supporting arms being in running fit with said screw stem, said lifting means comprising a nut-lifting sleeve and said supporting structure, wherein the supporting structure is saddle-shaped, said lift-guiding means having guiding surfaces on one of said supporting arms to engage slidably with guiding surfaces in the guiding means of the partially threaded nut, lift-limiting means for limiting the turning angle of said nut-lifting sleeve comprising limiting faces in the base plate to engage with the stop pins on the nut-lifting sleeve.

36. A synchro-clutching screw-and-nut mechanism as in claim 1, wherein said supporting structure has at least two supporting arms with holes in said supporting arms being in running fit with said screw stem, said lifting means comprising a nut-lifting sleeve and said supporting structure comprising a framework having side bars, the lift guiding means comprising the inner surfaces of the side bars which engage slidably with guiding surfaces of the guiding means of the partially threaded nut, the supporting structure also incorporates lift-limiting means for limiting the turning angle of said nut-lifting sleeve, and said lift-limiting means comprise limiting faces at the bottom side of the side bars of the framework.

37. A synchro-clutching screw-and-nut mechanism as in claim 36 wherein said side bars are separate members joined together by a fixing piece to form an independent component which is assembled with the framework.

38. A synchro-clutching screw-and-nut mechanism as in claim 1, wherein said supporting structure has at least two supporting arms with holes in said supporting arms being in running fit with said screw stem, said lifting means comprising a nut-lifting sleeve and said supporting structure comprises an integral part of a body.

39. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, the nut-lifting sleeve and the lifting means comprises:
   upper and lower cam surfaces provided on the inner periphery of one end of the nut-lifting sleeve, the lifting occurring by the action between the corners of the nut and the cam surfaces which engage.

40. A synchro-clutching screw-and-nut mechanism as in claim 1 wherein said lifting means further comprises a nut lifting sleeve having a bore in running fit with the outer periphery of the screw stem, the outer periphery of the nut-lifting sleeve being concentric with said bore and in contact with a supporting surface, the nut-lifting sleeve and the lifting means comprises:
   a cam surface on the lower part of the inner periphery at an end of the nut-lifting sleeve, the lifting occurring by the corner of the nut and the cam surface which engage with each other.

41. A synchro-clutching screw and nut mechanism as in claim 40 further comprising a spring to act on the upper part of the partially threaded nut.

42. A synchro-clutching screw-and-nut mechanism as in claim 1 wherein said lifting means further comprises a nut lifting sleeve having a bore in running fit with the other periphery of the screw stem, the outer periphery of the nut-lifting sleeve being concentric with said bore and in contact with a supporting surface, the nut-lifting sleeve and the lifting means comprises:
   a cam in engagement on the end faces of the partially threaded nut of the nut-lifting sleeve.

43. A synchro-clutching screw and nut mechanism as in claim 42 further comprising a spring to act on the upper part of the partially threaded nut.

44. A synchro-clutching screw-and-nut mechanism as in claim 1, further comprising an overload release device in the lifting means comprising:
   a radial pawl hole provided in the nut-lifting sleeve, and a pawl lodged therein, the pawl being in working engagement with an axial keyway in the screw stem, and is acted on by a looped coil spring.

45. A synchro-clutching screw-and-nut mechanism as in claim 1, further comprising an overload release device in the lifting means comprising:
   a friction ring, a guide key, a compression spring and a limiting ring, the friction ring received in the nut-lifting sleeve and being connected with the screw stem through the guide key, an axial keyway provided in said screw stem to engage with said guide key.

46. A synchro-clutching screw-and-nut mechanism as in claim 1, further comprising an overload release device in the lifting means comprising:
   a friction hoop, a torque transmission pin, the nut-lifting sleeve and a limiting ring, the hoop having an open slot, in its free state the internal diameter of the hoop being smaller than the external diameter of the screw stem, the hoop being mounted on the screw stem between said stem and said nut-lifting sleeve and being connected with said sleeve through the torque transmission pin.

47. A synchro-clutching screw-and-nut mechanism as in claim 1, further comprising an overload release device in the lifting means comprising:
   a springy expanding friction ring, a guide key, the nut-lifting sleeve and a limiting ring, the ring has an open slot, in its free state the diameter of the external periphery of the expanding ring is larger than the internal diameter of a bore of the nut-lifting sleeve, the ring being disposed between the screw stem and nut-lifting sleeve, said expanding ring being connected with said screw stem through the guide key engaged in an axial keyway provided in the screw stem.

48. A synchro-clutching screw-and-nut mechanism as in claim 1, further comprising an overload release device in the lifting means comprising:
   a slip sleeve, a guide key, a compression spring, a guide pin and the nut-lifting sleeve, at least one dent provided on an end face of the nut-lifting sleeve, the slip sleeve being connected with the screw stem through the guide key and an axial keyway provided in said screw stem.

49. A synchro-clutching screw-and-nut mechanism as in claim 1, further comprising an overload release device in the lifting means comprising:
   a slip sleeve, a guide key, a compression ring, a guide pin and the nut-lifting sleeve, the slip sleeve being connected with the screw stem through the guide key and an axial keyway provided in said screw stem.

50. A synchro-clutching screw-and-nut mechanism as in claim 1 wherein said lifting means comprises a nut-lifting sleeve and further comprising an overload release device for the lifting means which comprises a slip sleeve, a guide key, a compression spring, the nut-lifting sleeve and a jaw integrally formed in the end face of the slip sleeve, a mating jaw in an end face of the nut-lifting sleeve, a compression spring having sufficient play to allow for the sidewise movement of the slip sleeve.

51. A synchro-clutching screw-and-nut mechanism as in claim 1, wherein said supporting structure has at least two supporting arms with holes in said supporting arms being in running fit with said screw stem, said lifting means comprising a nut-lifting sleeve and said supporting structure comprises the supporting arms with the supporting holes secured to a movable vice member separate from the supporting structure.

52. A synchro-clutching screw-and-nut mechanism as in claim 1, which further comprises a locking device to control the lifting and depressing of the partially threaded nut.

* * * * *